United States Patent [19]

Okamoto et al.

[11] Patent Number: 5,541,572
[45] Date of Patent: Jul. 30, 1996

[54] VEHICLE ON BOARD TELEVISION SYSTEM

[75] Inventors: Shinya Okamoto; Shinichi Imoto, both of Iwaki, Japan

[73] Assignee: Alpine Electronics Inc., Tokyo, Japan

[21] Appl. No.: 157,591

[22] Filed: Nov. 23, 1993

[30] Foreign Application Priority Data

Nov. 25, 1992 [JP] Japan .................................. 4-315066

[51] Int. Cl.⁶ .................................................. B60Q 1/00
[52] U.S. Cl. ...................... 340/438; 340/428; 340/457.3
[58] Field of Search .................................... 340/428, 438, 340/457.3, 525, 522; 364/424.05, 426.01–.02, 431.09; 348/837

[56] References Cited

U.S. PATENT DOCUMENTS

| | | | |
|---|---|---|---|
| 5,066,941 | 11/1991 | Lau | 340/438 |
| 5,146,407 | 9/1992 | Motohashi | 340/428 |
| 5,191,312 | 3/1993 | Altmann et al. | 340/525 |
| 5,272,464 | 12/1993 | Jorgensen | 340/438 |
| 5,278,452 | 1/1994 | Matsumoto et al. | 340/438 |

*Primary Examiner*—John K. Peng
*Assistant Examiner*—Ashok Mannava
*Attorney, Agent, or Firm*—Guy W. Shoup; Norman R. Klivans; Patrick T. Bever

[57] ABSTRACT

An automobile onboard television system by which a normal television picture is displayed only when the automobile is stopped, as a safety feature. An image display condition of the television is switched over in response to an image display switching signal from a microcomputer. Information as to setting of the automobile parking brake, information about the accessory input in the automobile, and information indicating a time-out of a timer circuit are supplied to the microcomputer. The microcomputer determines the logical product of this information, to supply an image display switching signal for displaying a normal picture on the television only when particular logical products are output. The driver is therefore kept from watching the television while driving, and hence from driving carelessly.

5 Claims, 5 Drawing Sheets

VEHICLE ON BOARD TELEVISION SYSTEM

FIELD OF THE INVENTION

The Present invention relates to a vehicular onboard television system controlled by a microcomputer, and more particularly to an onboard vehicular television system safety feature, by which a normal television image is shown on the television screen only if the vehicle is stopped.

DESCRIPTION OF THE RELATED ART

In an onboard vehicular (e.g., automotive) television device controlled by a microcomputer, it has been conventional to interconnect the onboard television device to the microcomputer and also to interconnect the microcomputer and the parking brake of the automobile by an "interlock" cable through a buffer circuit. With such a safety feature, when the driver puts the automobile in a parked state (so the automobile is stopped and braked; usually represented by P), the "interlock" cable is grounded through the parking brake (manual or hand brake) so that a signal of logic L (or logic 0) is supplied to the microcomputer. Upon receiving the signal of logic L (or logic 0), the microcomputer supplies an image display switching signal of one polarity to the onboard television device for switching it to produce display images on its display screen.

On the other hand, when the driver puts the automobile into any other state (e.g., the drive state; usually represented by D) than the parked state, the cable is not grounded through the parking brake, so that a signal of logic H (or logic 1) is supplied to the microcomputer. Upon receiving the signal of logic H (or logic 1), the microcomputer supplies an image display switching signal of opposite polarity to the onboard television device for switching it to disable display images on the display screen. Display images on the display screen of the onboard television device are disabled by cutting off an internal power supply or ceasing supply of video signals to the display screen, for example, in response to the image display switching signal of opposite polarity.

However, drivers and passengers of automobiles often want to watch the onboard television device not only when the automobile is stopped, but also when it is temporarily stopped or even moving. Thus these people override the safety feature; the cable which should be connected to the parking brake, as mentioned above, is simply grounded by an individual vehicular modification. In these cases, the onboard television device is viewable at all times, regardless of whether the automobile is moving or stopped. This creates a safety hazard in that that the driver, who should be concentrating on driving, may divert his or her attention to watch the television and hence may drive carelessly.

SUMMARY OF THE INVENTION

With a view to overcoming the above-mentioned problem of overriding of the safety feature, one object of the present invention is to provide a vehicular (e.g., automotive) onboard television device having an improved safety feature where television images are displayed on a display screen only when the vehicle is stopped, regardless of a connected condition of the "interlock" cable which should be connected to the parking brake. The present invention is also applicable to vehicles not having a parking brake at all.

Another object of the present invention is to provide an onboard television device by which images are displayed on a display screen only when the "interlock" cable which should be connected to a parking brake is properly connected, and also the vehicle is stopped for a relatively long period of time.

To achieve the above first object, in an onboard television device in which an image display condition of a display screen is switched over in response to supply of an image display switching signal from a microcomputer, information about setting of the parking brake or gear shift lever of vehicle, information about an accessory input in the vehicle, and information indicating elapsed time of a timer circuit are supplied to the microcomputer, and the microcomputer determines the logical product of the information, to supply an image display switching signal for displaying normal images on the display screen only when any of the logical products is output.

To achieve the above second object in an onboard television device in which an image display condition of a display screen is switched over in response to supply of an image display switching signal from a microcomputer, a vibration sensor is disposed in the onboard television device (or connected to the onboard television device), information detected by the vibration sensor is converted into DC information by amplifying and rectifying a predetermined frequency component among said detected information and then supplied to the microcomputer, and the microcomputer supplies an image display switching signal for displaying normal images on the display screen only when the detected information exhibits a predetermined logical state.

Also, to achieve the above second object, in an onboard television device in which an image display condition of a display screen is switched over in response to supply of an image display switching signal from a microcomputer, an infrared or radio wave transmitter is attached to a steering apparatus of the vehicle, one or more infrared or radio wave receivers are attached to e.g., the ceiling of the vehicle interior, amplitude and phase variation components output from the receivers are supplied to the microcomputer, and the microcomputer supplies an image display switching signal for displaying normal images on the display screen only when the amplitude and/or phase variation component is below a predetermined level.

Further, to achieve the above second object, in an onboard television device in which an image display condition of a display screen is switched over in response to supply of an image display switching signal from a microcomputer, two poles of a bipolar sensor are attached to the steering apparatus of the vehicle at positions where the steering apparatus is gripped by both hands of the driver, a signal converted into electric binary information corresponding to a resistance value developed between the two poles of the bipolar sensor is supplied to the microcomputer, and the microcomputer supplies an image display switching signal for displaying normal images on the display screen only when the binary information exhibits a predetermined logical state.

According to the above first embodiment, the microcomputer detects that the logical product of the information about setting of the parking brake or gear shift lever and the accessory input information is output, or that the logical product of the accessory input information and the time-up information of the timer circuit (i.e., information due to elapsed time of the timer circuit) is output, and supplies the image display Switching signal for displaying normal images on the display screen of the onboard television device only when any of the logical products is detected as being output. Therefore, normal images are displayed on the display screen only when the vehicle is surely stopped, except for a temporary stopped period such as when the vehicle is waiting for a signal light, and during a warm-up operation of the vehicle in the morning, without needing any change in the parking state information. In other conditions such as while the vehicle is moving, normal images are not displayed on the display screen.

Also according to the above second embodiment, the vibration sensor detects vibrations, a particular vibration information component among the detected vibrations is extracted by a filter, and the extracted vibration information component is amplified and rectified for conversion into DC information. The DC information is converted by a logical circuit into a signal having a predetermined logical state (e.g., logic H or logic 1). The microcomputer supplies the image display switching signal for display normal images on the display screen of the onboard television device only when the signal having the predetermined logic is obtained. Therefore, normal images are displayed on the display screen only when there is no vibration specific to movement of the vehicle itself, i.e., when the vehicle is surely stopped. In other condition such as while the vehicle is moving, normal images are not displayed on the display screen.

Also, according to the above third embodiment, the one or more infrared or radio wave receivers attached to the vehicle interior receive infrared rays or radio waves emitted from the infrared or radio wave transmitter attached to the steering apparatus of the vehicle, and the received signals are supplied to AM and FM demodulators for separately detecting an amplitude and/or phase variation component. The microcomputer determines a level of the amplitude and/or phase variation component and supplies the image display switching signal for displaying normal images on the display screen of the onboard television device only when the detected level is below a predetermined level. Therefore, normal images are displayed on the display screen only when the amplitude and/or phase variation component is low in the reception signals from the infrared or radio wave receivers, when the vehicle is surely stopped and no steering is done by the driver. In other conditions such as when the vehicle is moving, normal images are not displayed on the display screen.

Also, according to the above fourth embodiment, the resistance value between the two poles of the bipolar sensor, which are attached to the steering apparatus of the vehicle at positions where the steering apparatus is gripped with both hands of the driver, is converted into an electric signal having a level proportional to the resistance value. If the driver grips the steering apparatus with both hands, the resistance value between the two poles of the bipolar sensor is reduced and hence the level of the electric signal is lowered. The electric signal is then converted into binary information corresponding to its level. At this time, when the level of the electric signal is low, the binary information is converted to have one logic state (e.g., logic L or logic 0). The microcomputer supplies the image display switching signal for displaying normal images on the display screen only when the binary information is detected as having the other logic state (e.g., logic H or logic 1). Therefore, normal images are displayed on the display screen only when the resistance value between the two poles of the bipolar sensor is large and the binary information exhibits the other logic state, when the vehicle is surely stopped and the driver is not gripping the predetermined positions on the steering apparatus with both hands. In other conditions such as when the vehicle is moving, normal images are not displayed on the display screen.

Thus, according to the present invention, normal images are displayed on the display screen of the onboard television device only when the vehicle is surely stopped. As a result, the driver is kept from watching the television device and hence from being neglectful of his driving.

It is to be understood that the disclosed embodiments are for automotive vehicles but may be modified for other vehicles (planes, boats, etc.)

DETAILED DESCRIPTION OF THE PREFERRED EMBODIMENTS

Hereinafter, several embodiments of the present invention are described in detail with reference to the drawings.

Figure 1:
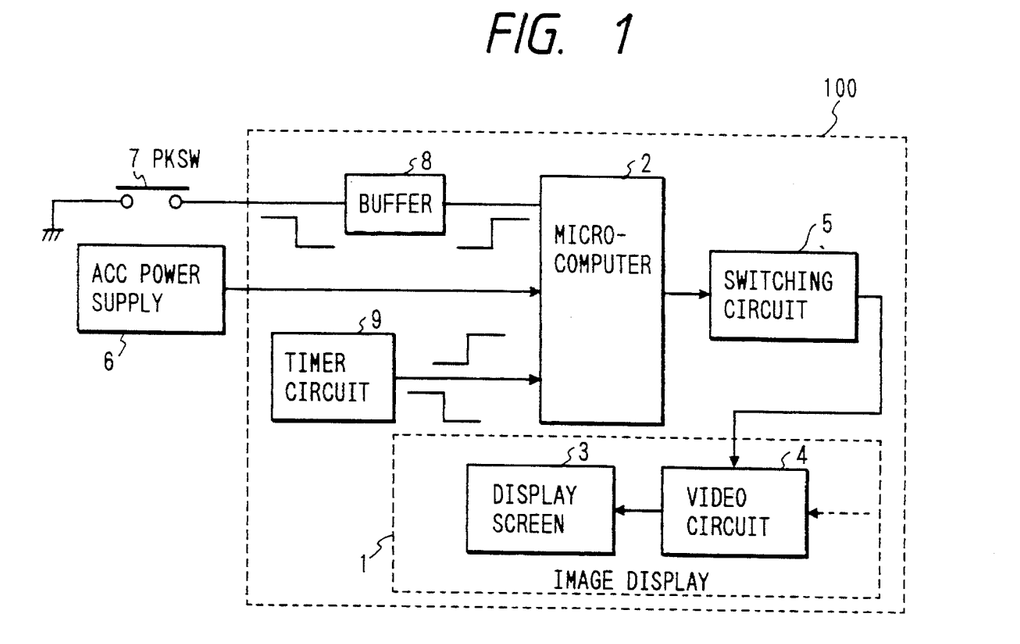
FIG. 1 is a block diagram showing a first embodiment of an onboard television device according to the present invention.

FIG. 1 is a block diagram showing a first embodiment of an onboard television device according to the present invention. FIG. 1 shows an image display 1, microcomputer 2, a display screen 3, video circuit 4, a switching circuit 5, an accessory (ACC) power supply 6, a parking brake setting switch 7 (PKSW), a buffer circuit 8, and a timer circuit 9. These components except the ACC power supply 6 and the PKSW 7 are incorporated in an onboard television device 100.

An image display 1 includes the display screen 3 and the video circuit 4, the video circuit 4 being connected to an output of the microcomputer 2 through the switching circuit 5. The microcomputer 2 is connected at its separate inputs to the PKSW 7 through the buffer circuit 8, the ACC power supply 6, and the timer circuit 9. The PKSW 7 is closed when the gear shift lever of an automobile is set to the parking state (P) or when the hand brake of the automobile is set (on).

In this embodiment, when the PKSW 7 is closed, a first logic signal transition from a logical state H (logic 1, hereinafter referred to as logic H) to a logical state L (logic 0, hereinafter referred to as logic L) is produced on the output side of the PKSW 7, and this logic signal is inverted by the buffer circuit 8 so that a first inverted logic signal transition from logic L to logic H is supplied to the microcomputer 2.

Also, when the ignition key of the automobile is operated to turn on to the accessory (ACC) position so that electric power is supplied to the onboard television device 100, a second logic signal transition from logic L to logic H is produced at an output of the ACC power supply 6, this second logic signal being directly supplied to the microcomputer 2. Further, when the timer circuit 9 in a set condition times out, a third logic signal transition from logic H to logic L is produced at an output of the timer circuit 9, this third logic signal being also directly supplied to the microcomputer 2.

Figure 2:
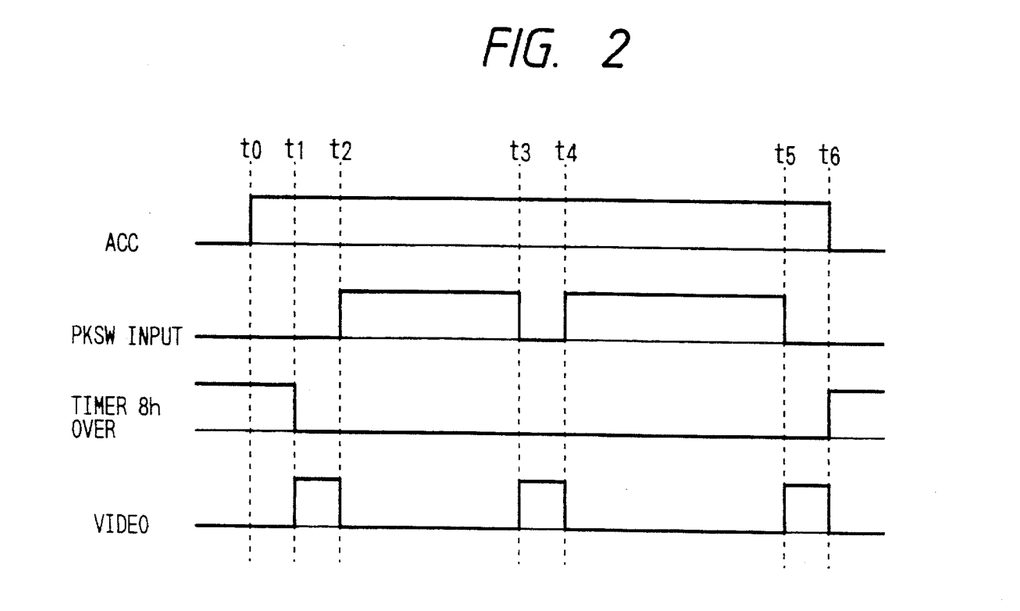
FIG. 2 is a timing chart showing states of various parts in the onboard television device of FIG. 1.

FIG. 2 is a timing chart showing states of various elements in the first embodiment, by way of example, for explaining its operation. In FIG. 2, "ACC" represents a state of the second logic signal produced at the output of the ACC power supply 6, "PKSW INPUT" represents a state of the first logic signal produced at the output of the PKSW 7, "TIMER TIME OVER" represents a state of the third logic signal produced at the output of the timer circuit (an 8-hour timer circuit in this embodiment) 9, and "VIDEO" represents a state of the display image produced on the display screen 3 of the image display 1.

The operation of this embodiment will now be described with reference to FIG. 2 as well.

First, prior to time $t_0$ before a driver gets in the automobile, clearly the ignition key is not inserted and the ACC condition is not turned on. Therefore, electric power supplied to the onboard television device 100 is cut off and, of course, no images are produced on the display screen 3 of the image display 1. At this time, the second logic signal produced at the output of the ACC power supply 6 has logic L, the first logic signal produced at the output of the PKSW 7 has logic L because the gear shift lever is set to the parking state (P), and further the third logic signal produced at the output of the timer circuit 9 has logic H because it has not yet timed out after the elapse of 8 hours.

Then, at time $t_0$ when the driver gets in the automobile and inserts the key to turn it on to the ACC position, the onboard television device 100 is supplied with electric power to enter an operative state and the second logic signal of logic H is delivered from the ACC power supply 6. At this time, the first logic signal still remains at logic L with no chance of transitioning from logic H to logic L, and the third logic signal also still remains at logic H. Accordingly, the microcomputer 2 will not supply an image display switching signal (i.e., an image display ON signal) for displaying normal images on the display screen 3, to the image display 1 through the switching circuit 5, whereby normal images are not displayed on the display screen 3.

Incidentally, though not shown, if the driver temporarily shifts the gear shift lever to any other state than the parking state (P) and thereafter shifts it back to the parking state (P) again in the above situation, a transition from logic H to logic L appears in the first logic signal, whereupon the microcomputer 2 detects the logical product of the transition of the first logic signal and the logic H of the second logic signal, thereby producing the image display ON signal at its output. In this case, therefore, normal images are displayed on the display screen 3 of the image display 1.

Subsequently, at time $t_1$, when the 8-hour timer circuit 9 times out, the third logic signal falls from logic H to logic L. At this time, the microcomputer 2 detects the logical product of the logic L of the first logic signal, the logic H of the second logic signal and the transition of the third logic signal, thereby producing the image display ON signal at its output so that normal images are displayed on the display screen 3 of the image display 1.

The 8-hour timer circuit 9 is used because otherwise, it would be required for the driver to shift the shift lever once to any other state than the parking state (P) and thereafter shift it back to the parking state (P) again, as mentioned above, if he desired to view the onboard television device during the warm-up of the automobile such as in the morning before driving. On the contrary, with the 8-hour timer circuit 9 set to time out just before the warm-up operation, the driver is not required to perform the above shift operation.

Next, at time $t_2$, when the warm-up period has ended and the driver shifts the gear shift lever to a state other than the parking state (P) for starting the automobile, the first logic signal transitions from logic L to logic H, whereupon the microcomputer 2 now supplies an image display switching signal (i.e., an image display OFF signal) for not displaying normal images on the display screen 3, to the image display 1 through the switching circuit 5. Accordingly, normal images cease to be displayed on the display screen 3.

Further, at time $t_3$, when the driver shifts the gear shift lever to the parking state (P) for stopping the automobile for a relatively long period, the first logic signal transitions from logic H to logic L. At this time, the microcomputer 2 detects the logical product of the transition of the first logic signal and the logic H of the second logic signal, thereby producing the image display ON signal at its output. As a result, normal images are displayed on the display screen 3 of the image display 1.

Following that, at time $t_4$, when the driver starts the automobile again after completion of the relatively long period in which the automobile has been stopped, the gear shift lever is shifted to a state other than the parking state (P) and the first logic signal transitions from logic L to logic H. At this time, therefore, the microcomputer 2 supplies the image display OFF signal for not displaying normal images on the display screen 3, to the image display 1 through the switching circuit 5. Accordingly, normal images cease to be displayed on the display screen 3.

Then, at time $t_5$, when the driver finishes driving for the day and shifts the shift gear lever to the parking state (P), the first logic signal transitions from logic H to logic L, whereupon the microcomputer 2 detects the logical product of the transition of the first logic signal and the logic H of the second logic signal, thereby producing the image display ON signal again at its output. As a result, normal images are enabled to be displayed on the display screen 3 of the image display 1.

Subsequently, at time $t_6$, when the driver turns the key to turn off the ACC condition upon exiting from the automobile, the electric power supplied to the onboard television device 100 is cut off and the onboard television device 100 enters an inoperative state. At the same time as the turning off of the ACC condition, the 8-hour timer circuit 9 is automatically set and the third logic signal transitions from logic L to logic H; hence the image display OFF signal is supplied to the image display 1. Note that at this time, the logic signals are all returned to their states before the time $t_0$ because the first logic signal has logic L and the second logic signal has logic L.

In the above arrangement, disabling displaying normal images on the display screen 3 of the image display 1 in response to supply of the image display OFF signal can be accomplished by, for example, (1) cutting off electric power supplied to the video circuit 4, (2) switching over the display images (picture) into monochromatic images, (3) indicating on the screen modes of the automobile and other onboard units rather than a broadcast television program, (4) switching over display images into a still picture, (5) physically storing the display screen 3 into its housing 1, or (6) substantially reducing the brightness of the display images.

Further, the above embodiment can be modified by providing a clock circuit in place of the timer circuit 9 such that when the time set by the driver in advance is reached, a third logic signal supplied from the clock circuit to the microprocessor 2 is designed to transition from logic H to logic L, whereupon the microcomputer 2 detects the logical product of the logic L of the first logic signal, the logic H of the second logic signal and the transition of the third logic signal, thereby producing the image display ON signal at its output. According to this embodiment, as explained above, normal images are displayed on the display screen 3 off, he image display 1 only when the "interlock" cable which should be connected to the parking brake is properly connected and also the automobile is stopped for a relatively long period of time. As a result, the driver is kept from watching the display images while driving, and the presence of the onboard television device 100 does not interfere with driving.

Figure 3:
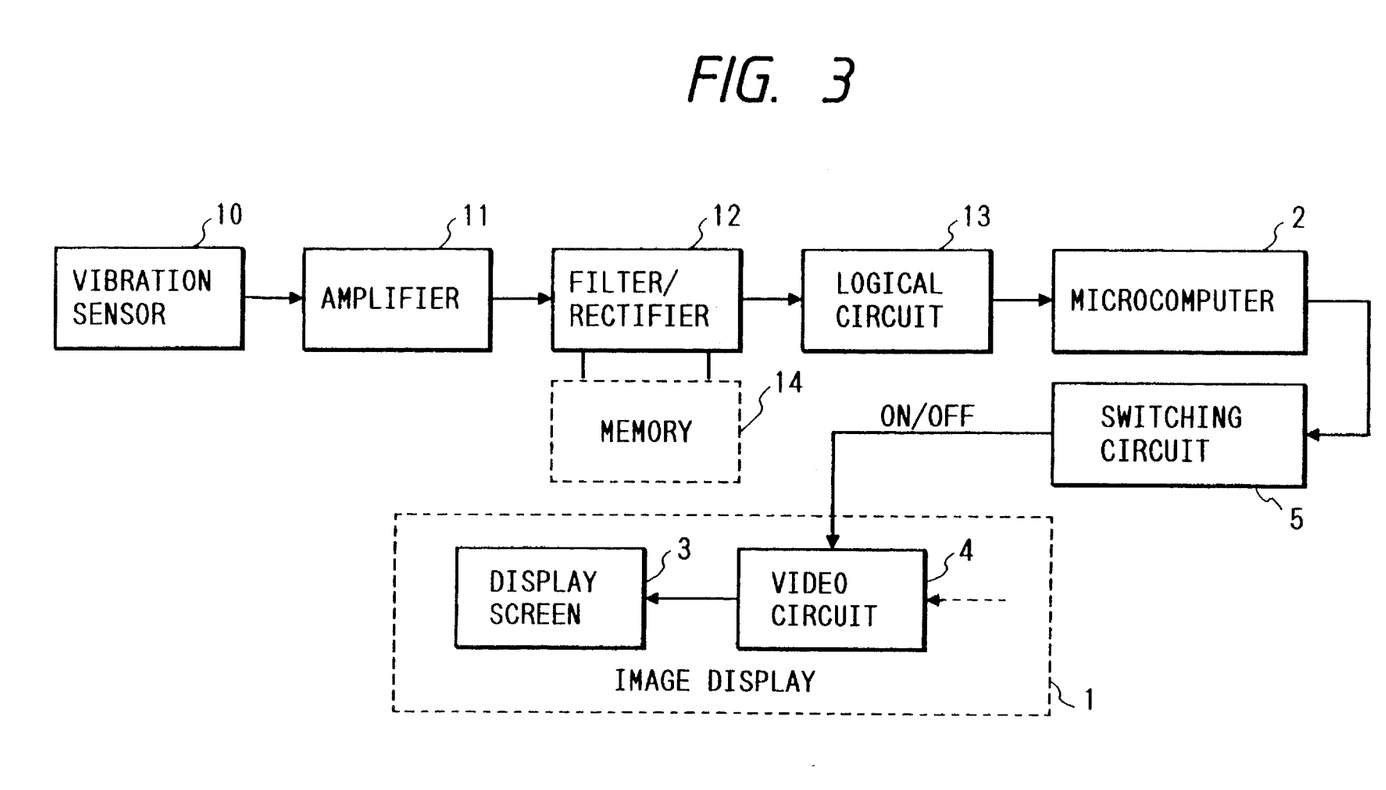
FIG. 3 is a block diagram showing a second embodiment of the onboard television device according to the present invention.

FIG. 3 is a block diagram showing a second embodiment of the onboard television device according to the present invention. FIG. 3 shows a vibration sensor 10, an amplifier 11, a filter/rectifier 12, a logical circuit 13, and a memory 14. The other components are those shown in FIG. 1 and are denoted by the same reference numerals.

The vibration sensor 10 is mounted in the onboard television device and senses vibrations produced while the automobile is moving. An output of the vibration sensor 10 is connected to an input of the microcomputer 2 through the amplifier 11, the filter/rectifier 12 and the logical circuit 13, and the memory 14 is connected to the filter/rectifier 12.

In the above arrangement, the vibration sensor 10 senses vibrations produced in the automobile, such as (1) vibration produced by the engine, (2) vibration produced by road surface irregularities, and (3) vibration produced automobile sway, thereby generating an electric signal which has components corresponding to those vibrations. Of those vibrations, only vibration (1) occurs when the automobile is stopped, while vibrations (1), (2) and (3) occur while the automobile is moving.

The electric signal sensed by the vibration sensor 10 is appropriately amplified by the amplifier 11 and then supplied to the filter/rectifier 12. The filter/rectifier 12 extracts only the vibrations (2) and (3) from the above vibrations (1), (2) and (3), i.e., extracts only those vibration components produced while the automobile is moving, and thereafter rectifies the extracted vibration components for conversion into a DC signal which has a level proportional to the extracted vibration components and is supplied to the logical circuit 13. The logical circuit 13 converts the DC signal into a binary logical signal depending on its level; namely, logic H when the level of the DC signal is so large that the extracted vibration components are apparently present, and logic L when it is otherwise. The binary logical signal is supplied to the microcomputer 2.

The microcomputer 2 generates at its output an image display switching signal (i.e., an image display ON signal) for displaying normal images on the display screen 3 of the image display 1 while it is receiving the logical signal of logic L, and an image display switching signal (i.e., an image display OFF signal) for not displaying normal images on the display screen 3 of the image display 1 when it receives the logical signal of logic H. The image display ON signal or the image display OFF signal is supplied to the image display 1 through the switching circuit 5. Thus, normal images are produced on the display screen 3 of the image display 1 when the image display ON signal is supplied, i.e., when the automobile is stopped, but normal images cease to be produced on the display screen 3 of the image display 1 when the image display OFF signal is supplied, i.e., while the automobile is moving.

In this embodiment, disabling of display of normal images on the display screen 3 of the image display 1 in response to supply of the image display OFF signal is accomplished by any of the methods cited in connection with the above first embodiment.

The filter/rectifier 12 used in this embodiment may be such that its filter characteristics are switched in several steps depending on the magnitude of specific vibration produced by the automobile itself. In this case, the switching of filter characteristics may be automatically carried out by connecting the memory 14 as indicated by the broken lines.

Further, for almost completely canceling out the specific vibration produced by the automobile itself, it is possible to provide a DSP (digital signal processor) or a sampling circuit in connection with the filter/rectifier 12, place the automobile in a quiet environment to determine the specific vibration, and obtain only those vibrations purely attributable to the movement when vibrations are sensed, by deducting the specific vibration from the sensed vibrations.

Additionally, only those vibrations purely attributable to the movement can be more accurately obtained by filtering out ignition noise in the power supply and matching with the cycle of extracted pulses in the measurement of the specific vibration.

According to this embodiment, as explained above, normal images are displayed on the display screen 3 of the image display 1 only when the automobile is stopped, and are not displayed when the automobile is moving and vibrations specific to the movement are produced in the automobile, regardless of the connected condition of the cable which should be connected to a parking brake. As a result, the driver is kept from watching the television while driving, and the presence of the onboard television device 100 will not interfere with his driving.

Figure 4:
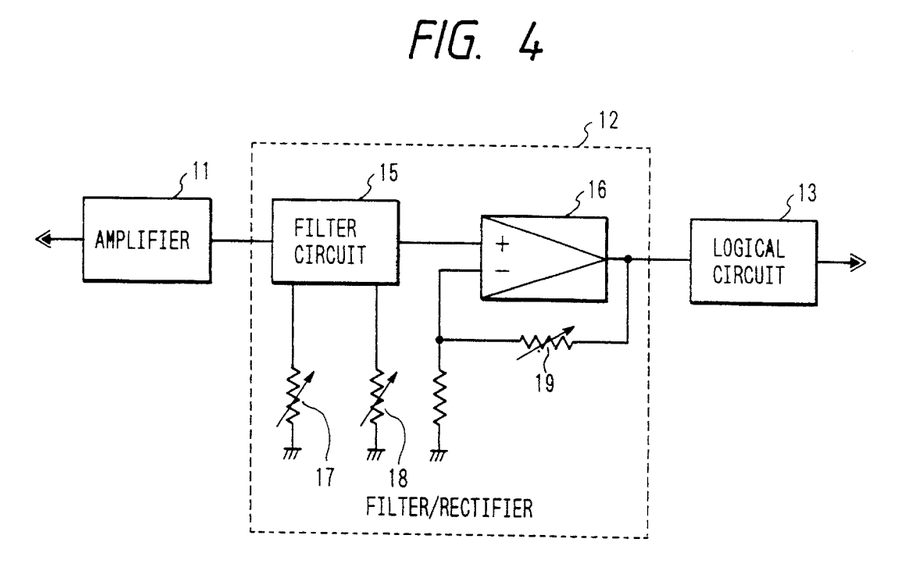
FIG. 4 is a circuit and block diagram showing one modification of the second embodiment of the onboard television device according to the present invention, the modification being for more higher accuracy.

FIG. 4 is a block diagram showing one example of an additional circuit in the second embodiment of the onboard television device according to the present invention, the additional circuit being intended to have higher accuracy. FIG. 4 shows a filter circuit 15, a rectifier/gain controller 16, a variable resistor 17 for adjusting frequency, a variable resistor 18 for adjusting Q, and a variable resistor 19 for adjusting gain. The other components are those shown in FIG. 3 and are denoted by the same reference numerals.

The aforesaid filter/rectifier 12 includes the filter circuit 15 and the rectifier/gain controller 16. The frequency adjusting variable resistor 17 and the Q adjusting variable resistor 18 are connected to the filter circuit 15, while the gain adjusting variable resistor 19 is connected to the gain controller 16.

This embodiment is suitable for those automobiles which produce relatively large specific vibration, such as off-road vehicles and diesel motor vehicles. In this embodiment, the arrangement of the filter/rectifier 12 in the above second embodiment is modified to be more suitable for removing a particular vibration component.

The filter/rectifier 12 first removes the component of specific vibration frequency in the filter circuit 15. At this time, the frequency adjusting variable resistor 17 is used to select the specific vibration frequency to be removed, and the Q adjusting variable resistor 18 is used to adjust selectivity of the specific vibration frequency to be removed, i.e., Q in a frequency select circuit. Then, the vibration component attributable to the traveling obtained after removing the specific vibration frequency is rectified and amplified by the rectifier/gain controller 16 to generate a DC signal. On this occasion, a level of the DC signal is adjusted by the gain adjusting variable resistor 19 for setting to logic H (or logic L) in the logical circuit 13.

According to this embodiment, when applied to those automobiles which produce large specific vibration, the accuracy in judging whether the automobile is moving or stopped is improved and the rate of malfunctions is significantly reduced.

Figure 5:
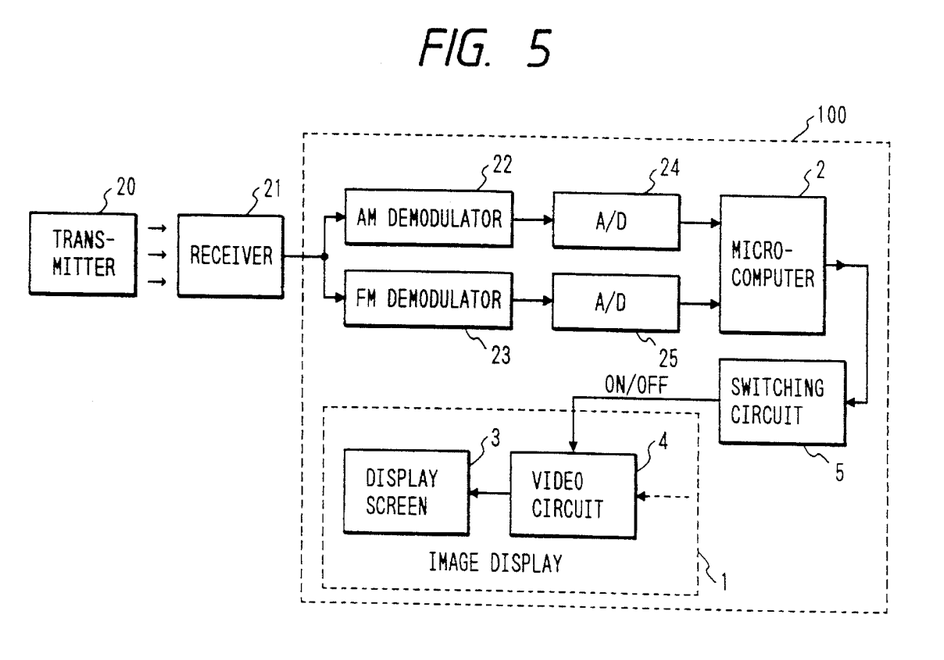
FIG. 5 is a block diagram showing a third embodiment of the onboard television device according to the present invention.
Figure 6A:
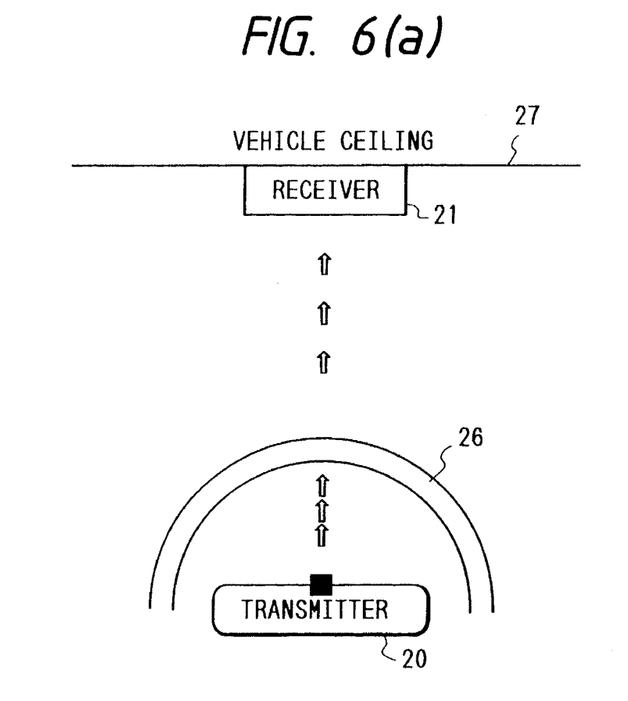
FIG. 6 is a view showing an example of arrangement of a transmitter and a receiver or receivers for the onboard television device of FIG. 5.
Figure 6B:
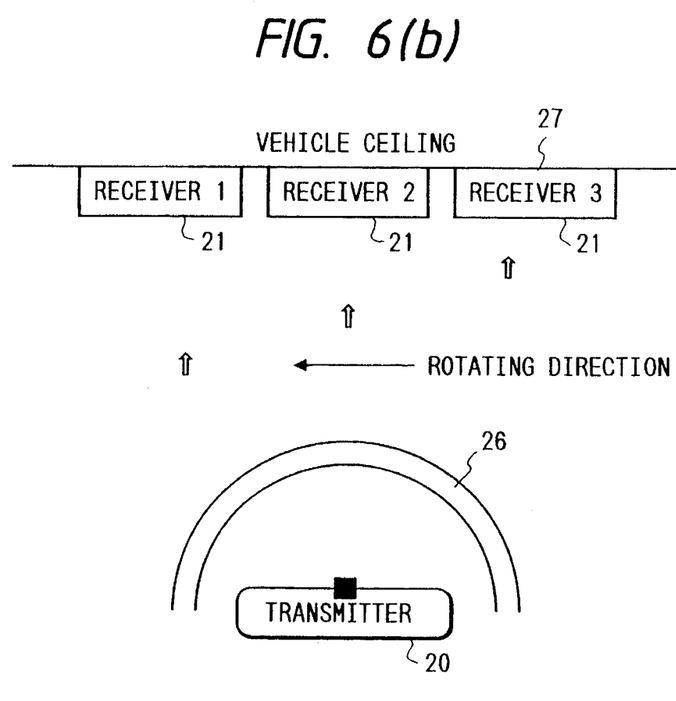

FIG. 5 is a block diagram showing a third embodiment of the onboard television device according to the present invention, and FIGS. 6(a) and 6(b) are views respectively showing examples of a transmitter and a receiver or receivers in the automobile according to this embodiment.

FIGS. 5 and 6(a) and 6(b) show an infrared or radio wave transmitter 20, an infrared or radio wave receiver 21, an AM (Amplitude Modulation) demodulator 22, an FM (Frequency Modulation) demodulator 23, a first analog/digital converter (A/D) 24, a second A/D 25, a steering wheel 26 of the automobile, and the ceiling 27 of the vehicle interior. The other components are as shown in FIG. 1 and are denoted by the same reference numerals.

This embodiment is based on the assumption that the driver inevitably turns the steering wheel 26 while the automobile is moving, and that even when the automobile is traveling on a long straight road, for example, steering (i.e., rotation of the steering wheel) will occur every few seconds. The infrared or radio wave transmitter 20 is attached to the steering wheel 26 (at a position non-interfering with the steering operation) such that its infrared or radio wave transmitting portion faces upwards.

Conversely, the infrared or radio wave receiver 21 is attached to the ceiling 27 (or elsewhere) of the vehicle interior such that its infrared or radio wave receiving portion faces downwards. A signal output received by the receiver 21 is supplied to separate inputs of the microcomputer 2 through the AM demodulator 22 and the first A/D 24 and the FM demodulator 23 and the second A/D 25, respectively.

In the above arrangement, infrared rays or radio waves emitted from the infrared or radio wave transmitter 20 attached to the steering wheel 26 are received by the infrared or radio wave receiver 21 attached to the ceiling 27. Assuming now that the steering wheel 26 is rotated to the right or left from its neutral position and then returned to the neutral position again depending on the steering of the automobile, the reception signal output from the receiver 21 becomes an amplitude modulation (AM) signal of which amplitude changes are large-small large successively, in the case where the receiver 21 is arranged as shown in FIG. 6(a).

In the alternative case having plural receivers 21 as shown in FIG. 6(b), when the steering wheel 26 is rotated from the right to the left, the reception signals output from the receivers 21 become a phase modulation (PM or FM) signal, the phase of which is shifted sequentially in accordance with the received signal timing. In the latter case, the reception signal output from one receiver 21 at the center also becomes an amplitude modulation (AM) signal having amplitude changes large-small-large successively. Therefore, when the plural receivers 21 are arranged as shown in FIG. 6(b), both the AM and FM signals can be taken out.

The resulting AM signal is applied to the AM demodulator 22 in which only the AM component is demodulated and extracted, followed by conversion into a first digital signal by the first A/D 24. Likewise, the resulting FM signal is applied to the FM demodulator 23 in which only the FM component is demodulated and extracted, followed by conversion into a second digital signal by the second A/D 25. The first and second digital signals are supplied to the respective inputs of the microcomputer 2.

The microcomputer 2 generates at its output an image display switching signal (i.e., an image display ON signal) for displaying normal images on the display screen 3 of the image display 1 when the first and/or second digital signal provides data indicating no rotation of the steering wheel, and an image display switching signal (i.e., an image display OFF signal) for not displaying normal images on the display screen 3 of the image display 1 when the first and/or second digital signal provides data which indicates rotation of the steering wheel or an zero output of the receiver(s) 21.

The image display ON signal or the image display OFF signal is supplied to the image display 1 through the switching circuit 5. Thus, normal images are produced on the display screen 3 of the image display 1 when the image display ON signal is supplied, i.e., when the automobile is stopped with no steering operation effected. On the other hand, normal images cease to be produced on the display screen 3 of the image display 1 when the image display OFF signal is supplied, i.e., while the automobile is moving with steering occurring.

In this embodiment, it is preferable to arrange the plural receivers 21 as shown in FIG. 6(b) so that both the AM and FM signals are detected to generate the image display ON signal or the image display OFF signal depending on the two type signals. Despite a slight reduction in detection accuracy, the arrangement of the receiver 21 as shown in FIG. 6(a) can also provide information sufficient to determine whether the automobile is moving or stopped; hence it can function comparably to the arrangement of the receivers 21 as shown in FIG. 6(b).

It is also preferable that, in the arrangement of the receivers 21 as shown in FIG. 6(b), the image display OFF signal not be immediately generated when only the AM signal is detected and no FM component is detected. The reason is because such a condition may often occur upon the infrared rays or radio waves emitted from the transmitter 20 being interrupted by the driver's hand when the automobile is stopped.

For the arrangement of the receivers 21 as shown in FIG. 6(b), it is also practicable to provide particular AM demodulators 22 associated with the receivers 21 in one-tone relation rather than providing the FM demodulator 23 common to the receivers 21, and monitor the order at which AM components detected by the AM demodulators 22 are varied. Such a modification can also achieve a similar function to this embodiment.

In this embodiment, disabling displaying of normal images on the display screen 3 of the image display 1 in response to supply of the image display OFF signal is accomplished by any of the methods cited in connection with the above first embodiment.

According to this embodiment, as explained above, on the assumption that the transmitter 20 and the receiver(s) 21 are properly arranged, normal images are displayed on the display screen 3 of the image display 1 only when the automobile is stopped; normal images are not displayed when the steering wheel 26 is turned by the driver while the automobile is moving, regardless of the connected condition of the cable which should be connected to the parking brake. As a result, the driver is kept from watching the display images while driving, and the presence of the onboard television device 100 will not interfere with driving.

Figure 7:
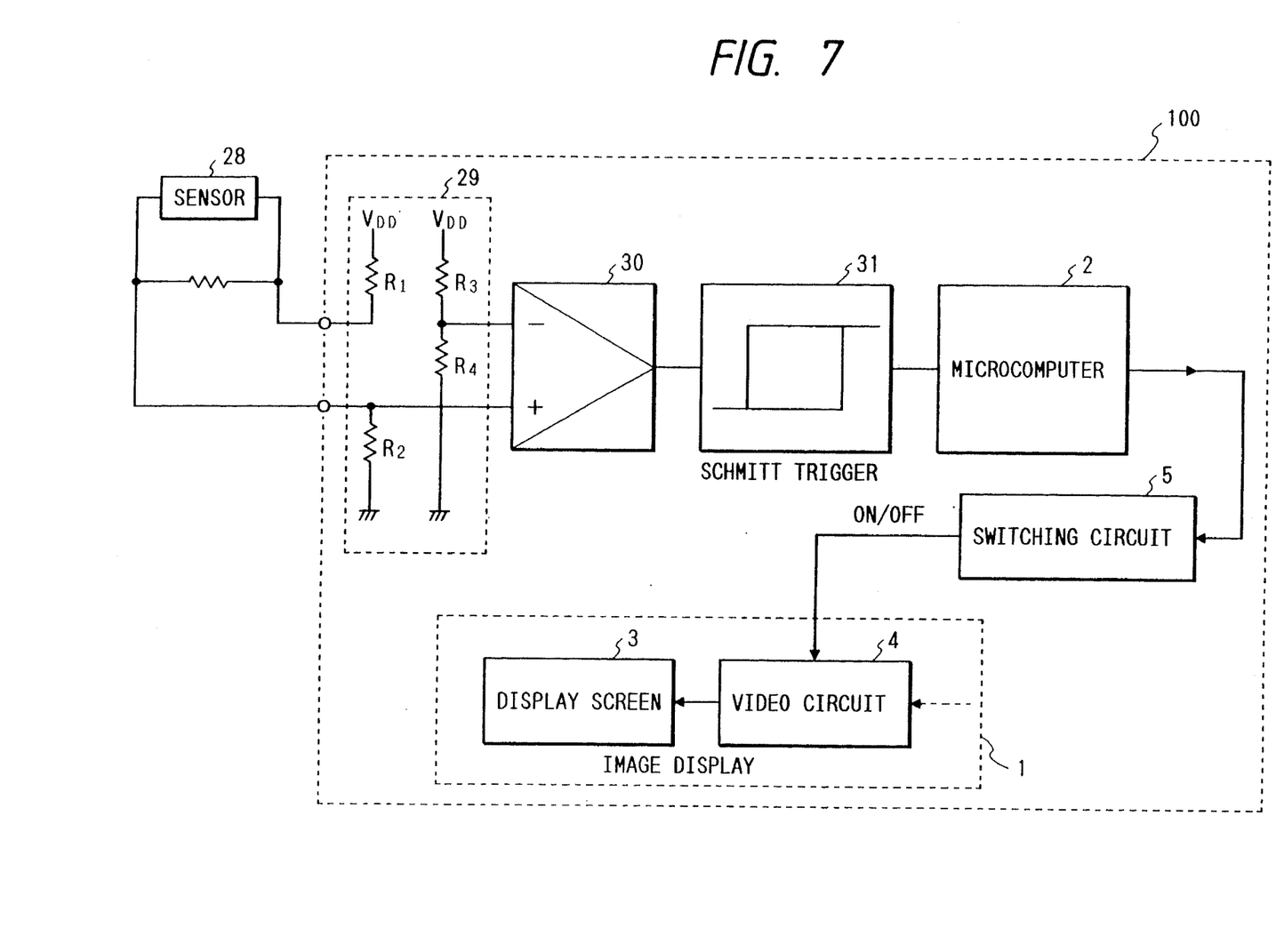
FIG. 7 is a circuit and block diagram showing a fourth embodiment of the onboard television device according to the present invention.

FIG. 7 is a block diagram showing a fourth embodiment of the onboard television device according to the present invention.

FIG. 7 shows a bipolar sensor 28 in the form of a thin film sheet, a resistance circuit 29, a comparator 30, and a Schmitt trigger circuit 31. The other components are those shown in FIG. 1 and are denoted by the same reference numerals.

The bipolar sensor 28 in the form of a thin film sheet includes a pair of conductive sheets each of which has a thickness of several tens microns, for example, and which are adhered to the steering wheel of the automobile such that the sheets are respectively located where the steering wheel is gripped by the driver's hands. The resistance circuit 29 has four fixed resistors $R_1$ to $R_4$ and a resistance value of the bipolar sensor 28. The resistors $R_3$ and $R_4$, supplied with a voltage $V_{DD}$, cooperatively set a detecting or reference voltage for the comparator 30, while the resistors $R_1$, $R_2$ and the resistance of the sensor 28, all supplied with the voltage $V_{DD}$, cooperatively apply a compared voltage. The comparator 30 has two inputs to receive respective outputs, i.e., the reference voltage and the compared voltage, of the resistance circuit 29, and has an output connected to the Schmitt trigger circuit 31. The Schmitt trigger circuit 31 converts a compared output from the comparator 30 into a corresponding binary signal and supplies it to the microcomputer 2 after removing short time changes in a signal level.

With the above arrangement, when the automobile is stopped for a relatively long period of time and the driver removes his or her hands from the steering wheel or places the hands away from the bipolar sensor 28, the pair of conductive sheets of the bipolar sensor 28 adhered to the steering wheel are held in such a completely open condition that the resistance value therebetween can be regarded as almost infinite. The comparator 30 is then supplied with the positive reference voltage at its non-inverted input terminal (+), and with the ground voltage at its inverted input terminal (−). Therefore, a logic signal of logic H (positive voltage) is obtained at the output of the comparator 30 and then supplied to the microcomputer 2 through the Schmitt trigger circuit 31. Upon receiving the logic signal of logic H, the microcomputer 2 generates at its output an image display switching signal (i.e., an image display ON signal) for displaying normal images on the display screen 3 of the image display 1. The image display ON signal is supplied to the image display 1 through the switching circuit 5 so that normal images are displayed on the display screen 3 of the image display 1.

On the other hand, when the driver starts driving the automobile while gripping the steering wheel with both hands in contact with the pair of conductive sheets of the bipolar sensor 28, the pair of conductive sheets are thereby short-circuited and the resistance value therebetween can be regarded as relatively small. At this time, the comparator 30 is supplied with the positive reference voltage at its non-inverted input terminal (+), and with a positive voltage, slightly higher than the reference voltage, at its inverted input terminal (−). Therefore, a logic signal of logic L (ground voltage) is obtained at the output of the comparator 30 and then supplied to the microcomputer 2 through the Schmitt trigger circuit 31. Upon receiving the logic signal of logic L, the microcomputer 2 generates at its output an image display switching signal (i.e., an image display OFF signal) for not displaying normal images on the display screen 3 of the image display 1. The image display OFF signal is supplied to the image display 1 through the switching circuit 5 so that normal images cease to be displayed on the display screen 3 of the image display 1.

It is thought that although the driver usually grips the steering wheel with both hands while the automobile is moving, he or she may release one or both hands from the steering wheel for a while for some reason. It is also thought that, when the automobile is stopped, the driver may touch the bipolar sensor 28 on the steering wheel with both hands for a while.

In view of this, this embodiment does not change over the image display switching signal obtained at the output of the microcomputer 2 under such conditions. Thus, the Schmitt trigger circuit 31 is provided on the output side of the comparator 30 to eliminate momentary changes in a logical state of the logic signal produced at the output of the comparator 30.

In this embodiment, disabling display of normal images on the display screen 3 of the image display 1 in response to supply of the image display OFF signal is accomplished by any of the methods cited in connection with the above first embodiment.

According to this embodiment, as explained above, on the assumption that the transmitter 20 and the receiver(s) 21 are properly arranged, normal images are displayed on the display screen 3 of the image display 1 only when the automobile is stopped; normal images are not displayed when the automobile is moving and the driver grips the steering wheel with both hands, regardless of the connected condition of a cable which should be connected to a parking brake. As a result, the driver is kept from watching the display images while driving, and the presence of the onboard television device 100 will not interfere with driving.

As described above, according to the invention, since normal images are displayed on the display screen 3 of the image display 1 only when the cable which should be connected to a parking brake is properly connected and the automobile is stopped for a relatively long period of time, including for warm-up in the morning, advantageously the driver is kept from watching the television while driving, and the onboard television device 100 will not interfere with driving even if the parking brake cable safety feature is overridden.

Also, according to the invention, since normal images are displayed on the display screen 3 of the image display 1 only when the automobile is stopped, regardless of the connected condition of the cable which should be connected to a parking brake, advantageously only the driver is kept from watching the television while driving, and the onboard television device 100 will not interfere with his driving.

What is claimed is:

1. An onboard vehicular television device for a vehicle, the vehicle including a switch indicating a parking state of the vehicle and an accessory power supply, the device comprising:

a timer circuit;

a display screen; and a controller;

wherein an image display condition of said display screen is switched such that the display screen displays normal images in response to an image display switching signal transmitted from said controller, wherein the controller receives a first signal from the switch indicating the parking state of the vehicle, a second signal indicating an activation of the accessory power supply, and a third signal generated by the timer circuit, and wherein said controller generates the image display switching signal only when the first signal from said switch indicates that said vehicle is in said parking state, said second signal from said accessory power supply indicates that said accessory power supply has been activated, and said third signal from said timer circuit indicates that a predetermined time period has expired since a previous deactivation of said accessory power supply.

2. An onboard television device according to claim 1, wherein said third signal information indicates a time-out of a timer.

3. An onboard television device according to claim 1, wherein said third signal indicates that a preset time has been reached.

4. An onboard television device according to claim 1, wherein said first signal indicating said parking state is from detecting whether a shift lever of said vehicle has been set to a parking state and whether said shift lever is held set to the parking state.

5. An onboard television device according to claim 1, wherein said first signal indicating said parking state is from detecting whether a hand brake of said vehicle has been set and whether said hand brake is held set.

* * * * *